(12) United States Patent
Nakagawa

(10) Patent No.: US 10,425,813 B2
(45) Date of Patent: Sep. 24, 2019

(54) AUTHENTICATION MANAGEMENT METHOD, INFORMATION PROCESSING APPARATUS, WEARABLE DEVICE, AND COMPUTER PROGRAM

(71) Applicant: CANON KABUSHIKI KAISHA, Tokyo (JP)

(72) Inventor: Kenichiro Nakagawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 15/511,919

(22) PCT Filed: Nov. 16, 2015

(86) PCT No.: PCT/JP2015/005696
§ 371 (c)(1),
(2) Date: Mar. 16, 2017

(87) PCT Pub. No.: WO2016/079974
PCT Pub. Date: May 26, 2016

(65) Prior Publication Data
US 2017/0295492 A1    Oct. 12, 2017

(30) Foreign Application Priority Data
Nov. 19, 2014  (JP) ................. 2014-234363

(51) Int. Cl.
*H04L 29/06*    (2006.01)
*H04W 12/06*    (2009.01)
(Continued)

(52) U.S. Cl.
CPC ........ *H04W 12/06* (2013.01); *G02B 27/0172* (2013.01); *G06F 21/36* (2013.01);
(Continued)

(58) Field of Classification Search
CPC .............. H04W 12/06; H04L 63/0853; H04L 2463/082; H04N 7/183; G06F 21/44; G02B 27/0172; G02B 2027/0138; G02B 2027/014; G02B 2027/0178; H04B 1/3827
USPC ..................................... 726/1–7, 9; 713/168
See application file for complete search history.

(56) References Cited

U.S. PATENT DOCUMENTS 8,166,523 B2 *  4/2012  Ezaki ..................... G06F 21/32
                                                                380/247
8,963,806 B1 *  2/2015  Starner ............. G02B 27/0093
                                                                345/7
(Continued)

FOREIGN PATENT DOCUMENTS

JP    2005-352024 A    12/2005
JP    2007-003745 A     1/2007
(Continued)

*Primary Examiner* — Hosuk Song
(74) *Attorney, Agent, or Firm* — Venable LLP

(57) ABSTRACT

An authentication management method executed in a plurality of apparatuses cooperating each other communicably connecting, to allow reception of instruction by a user, a first information processing apparatus which performs authentication that the user is a predetermined person and a second information processing apparatus which is worn by the user, in a case where the user wearing the second information processing apparatus has been identified, by the second information processing apparatus, to be the predetermined person, identifying, by the second information processing apparatus, whether or not the first information processing apparatus and the second information processing apparatus are associated with each other as a plurality of apparatuses which perform cooperative processing.

14 Claims, 13 Drawing Sheets

(51) Int. Cl.
  *G06F 21/36* (2013.01)
  *G06F 21/44* (2013.01)
  *G02B 27/01* (2006.01)
  *G06K 7/14* (2006.01)
  *H04B 1/3827* (2015.01)
  *H04N 7/18* (2006.01)

(52) U.S. Cl.
  CPC ........... *G06F 21/44* (2013.01); *G06K 7/1417* (2013.01); *H04B 1/3833* (2013.01); *H04L 63/0853* (2013.01); *H04N 7/183* (2013.01); *G02B 2027/014* (2013.01); *G02B 2027/0138* (2013.01); *G02B 2027/0178* (2013.01); *H04L 2463/082* (2013.01)

(56) References Cited

U.S. PATENT DOCUMENTS

| | | | |
|---|---|---|---|
| 8,994,498 B2 * | 3/2015 | Agrafioti | G06F 21/40 340/5.82 |
| 9,032,501 B1 * | 5/2015 | Martin | H04L 9/3213 726/10 |
| 9,251,333 B2 * | 2/2016 | Chatterton | G06F 3/0486 |
| 9,646,216 B2 * | 5/2017 | Baca | G06F 21/32 |
| 2005/0275714 A1 | 12/2005 | Ishikawa et al. | |
| 2009/0300733 A1 | 12/2009 | Inomata et al. | |

FOREIGN PATENT DOCUMENTS

| | | | |
|---|---|---|---|
| JP | 2008-003743 A | 1/2008 |
| JP | 2009-175859 A | 8/2009 |
| JP | 2012-008746 A | 1/2012 |
| JP | 2012-138011 A | 7/2012 |

* cited by examiner

[Fig. 1]
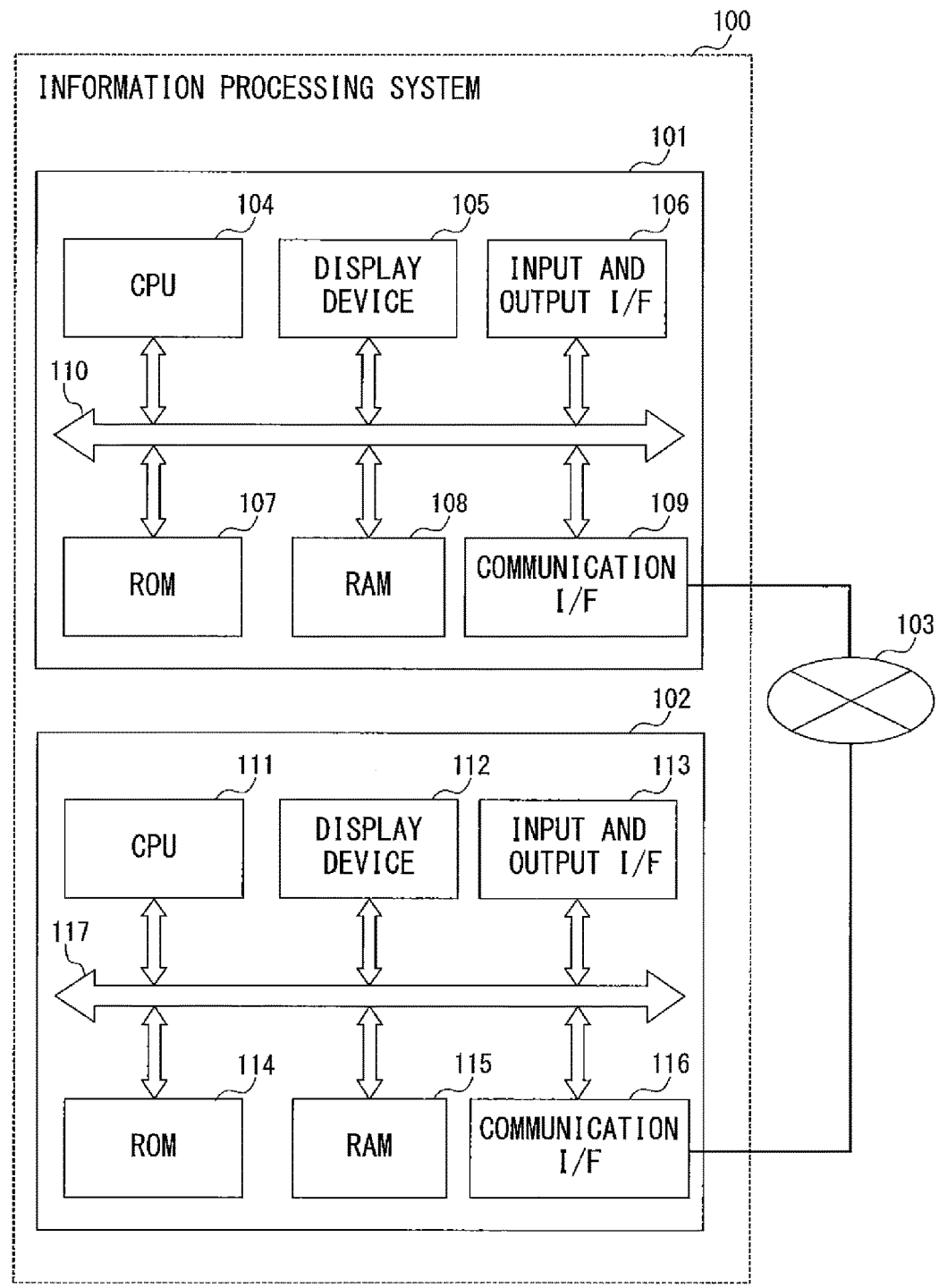

[Fig. 2]
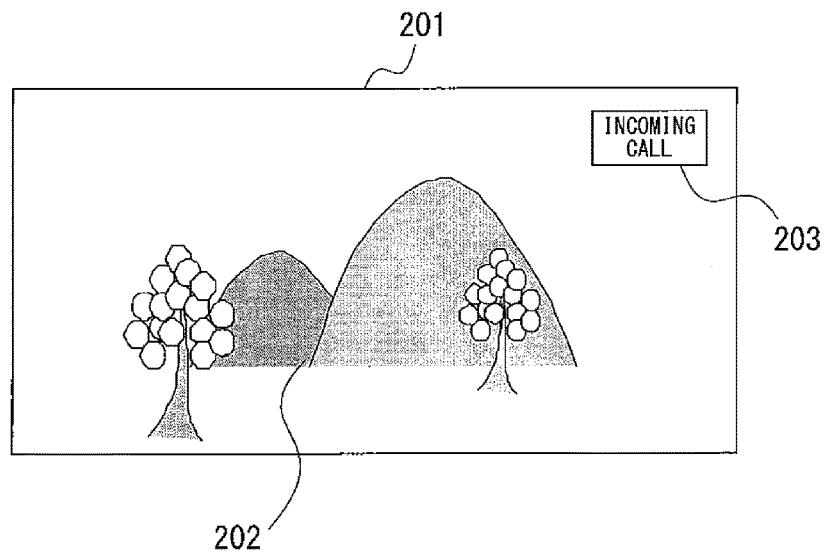
[Fig. 3]
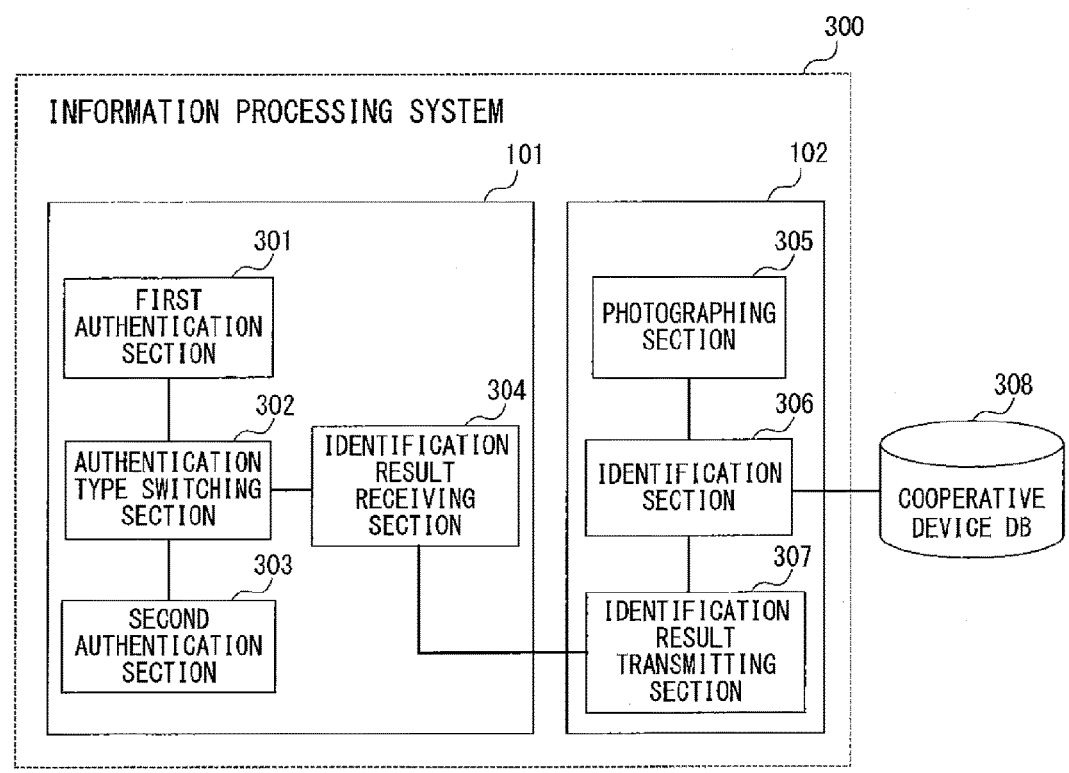

[Fig. 4A]
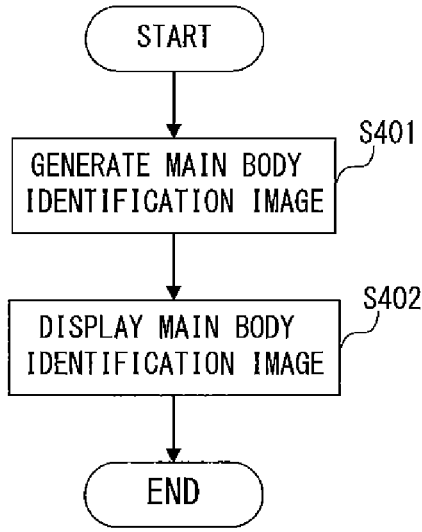
[Fig. 4B]
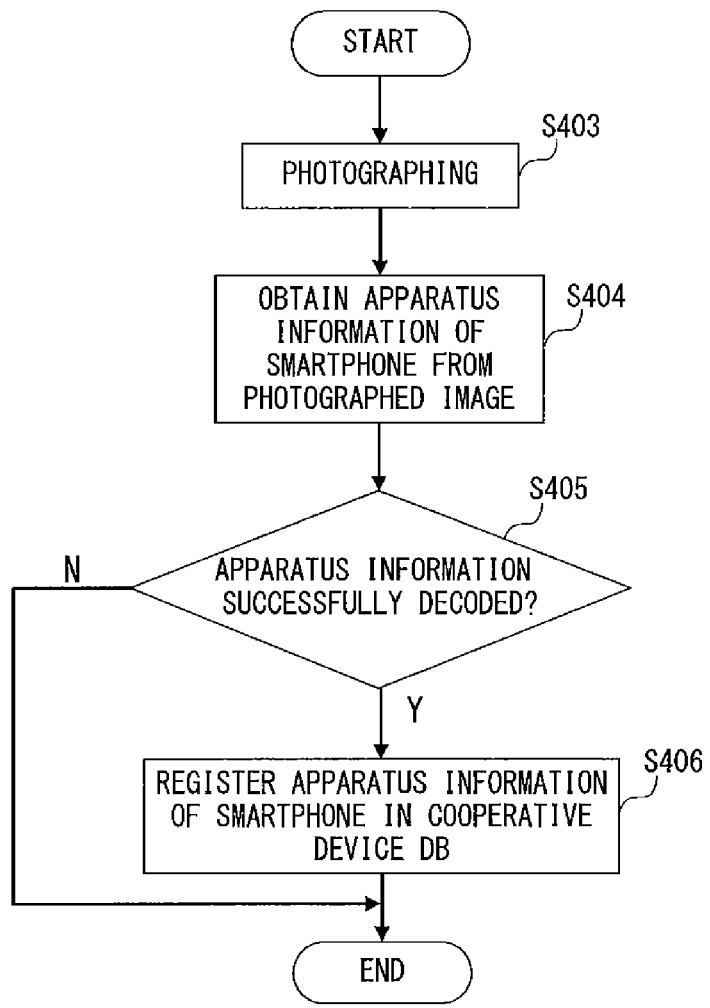

[Fig. 5]
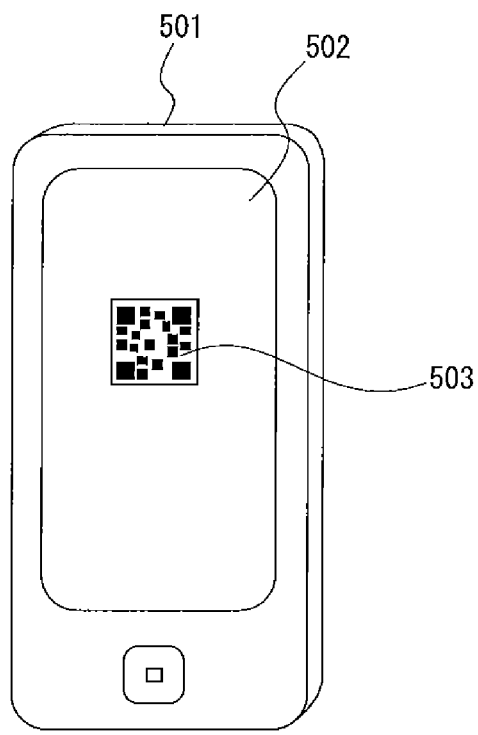
[Fig. 6A]
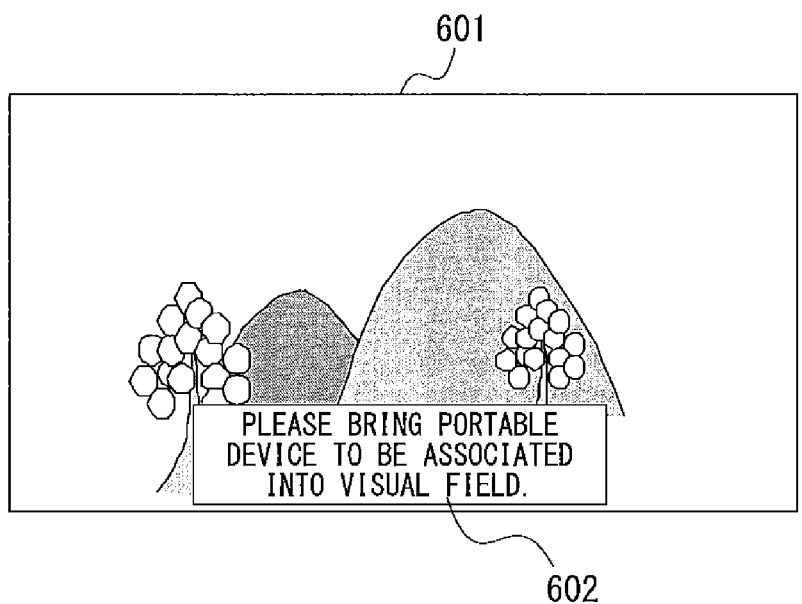

[Fig. 6B]
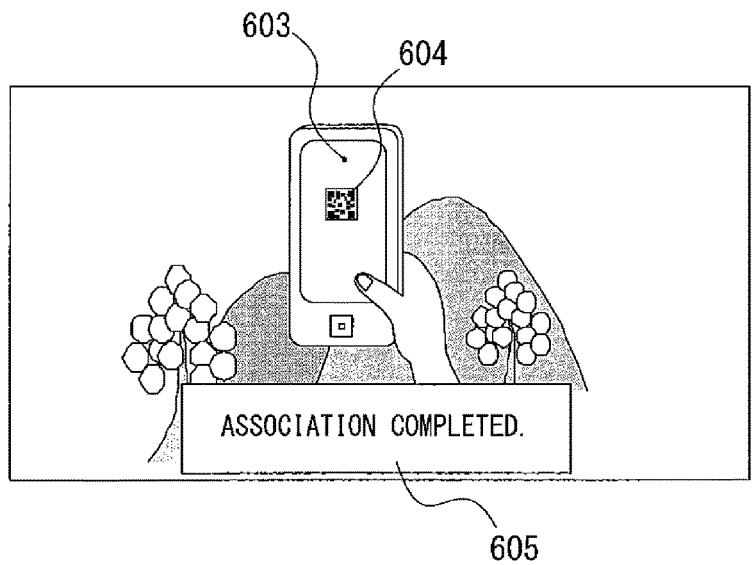
[Fig. 7]
| PORTABLE DEVICE NAME | IP |
|---|---|
| SS-1205 | 189.145.2.45 |
| YY 0 | 189.145.2.44 |
701
[Fig. 8A]
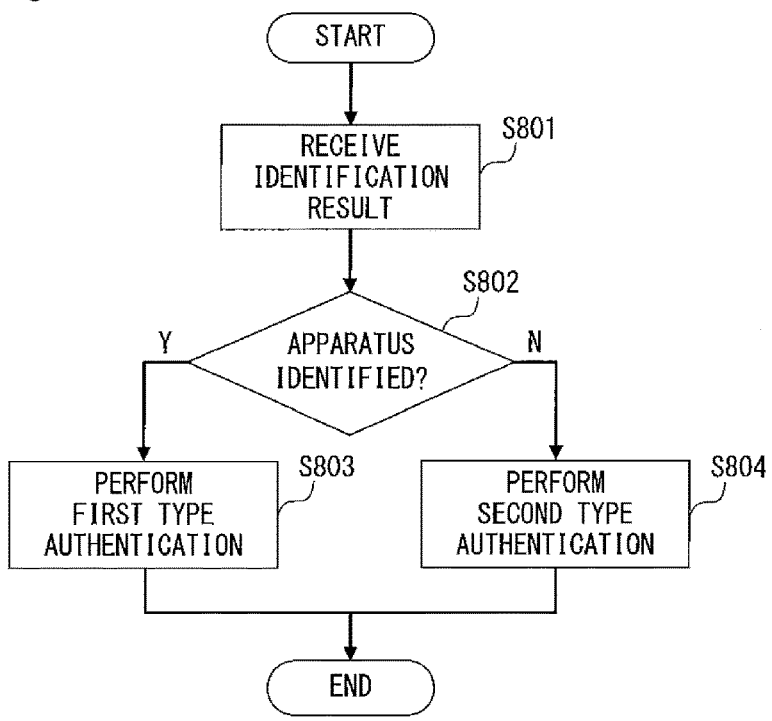

[Fig. 8B]
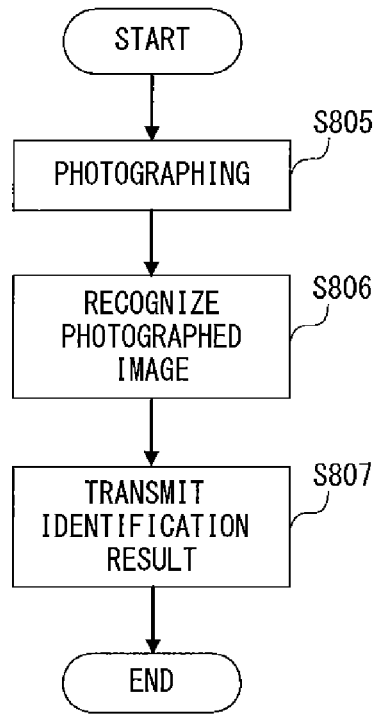
[Fig. 9]
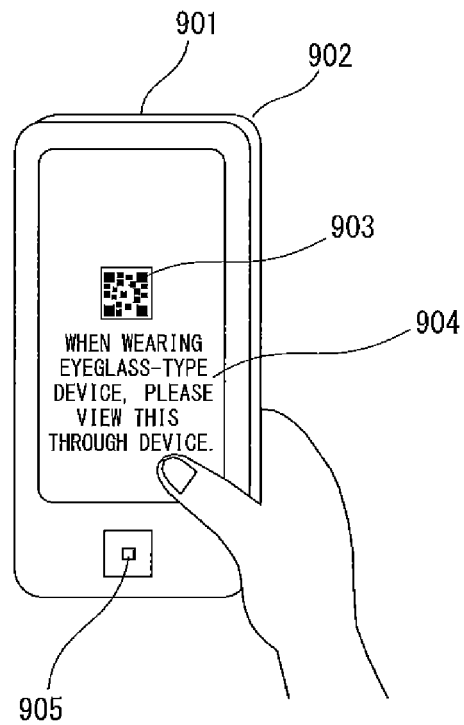

[Fig. 10A]
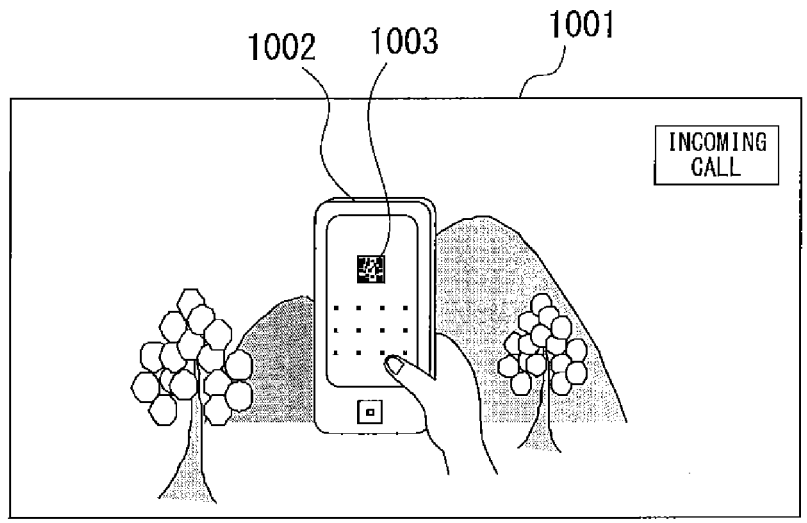
[Fig. 10B]
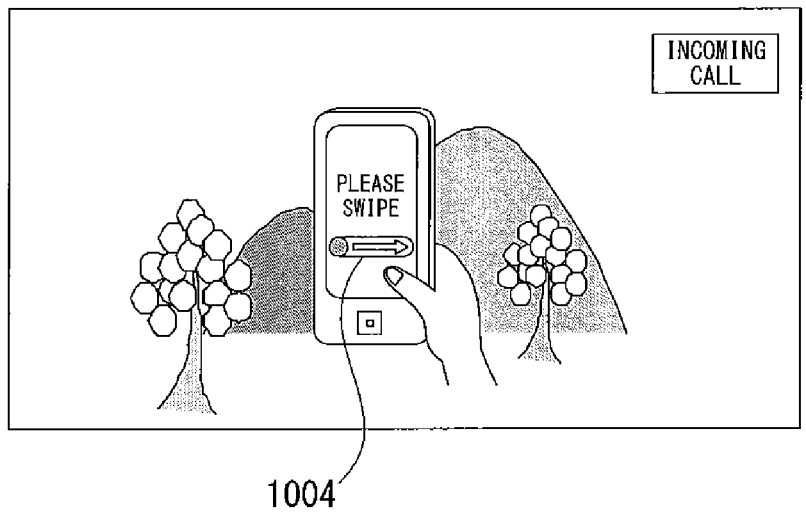
[Fig. 10C]
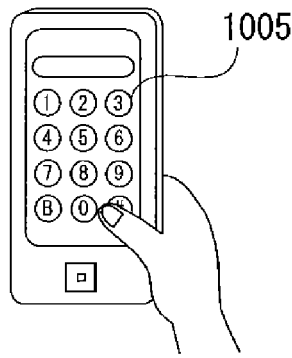

[Fig. 11A]
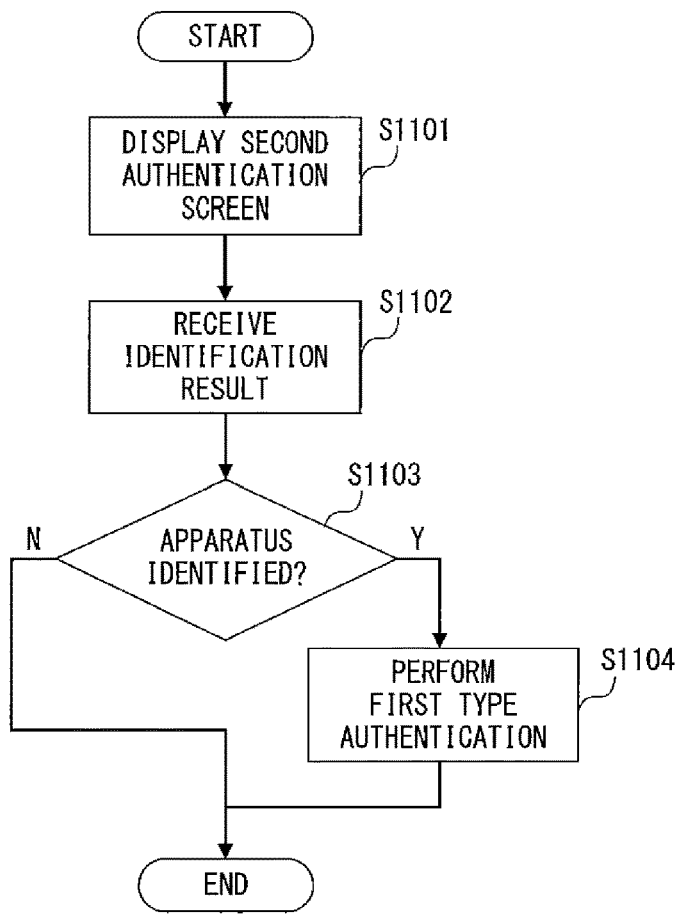
[Fig. 11B]
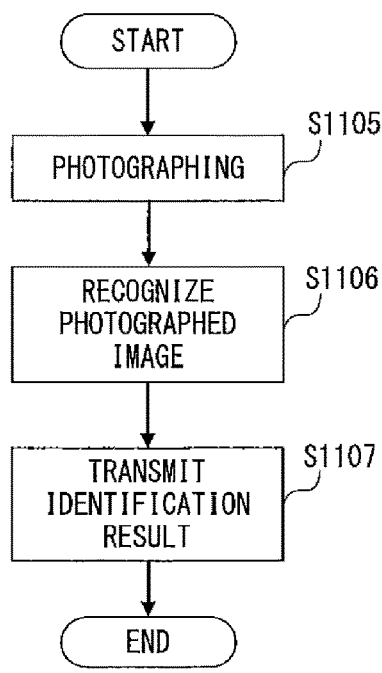

[Fig. 12]
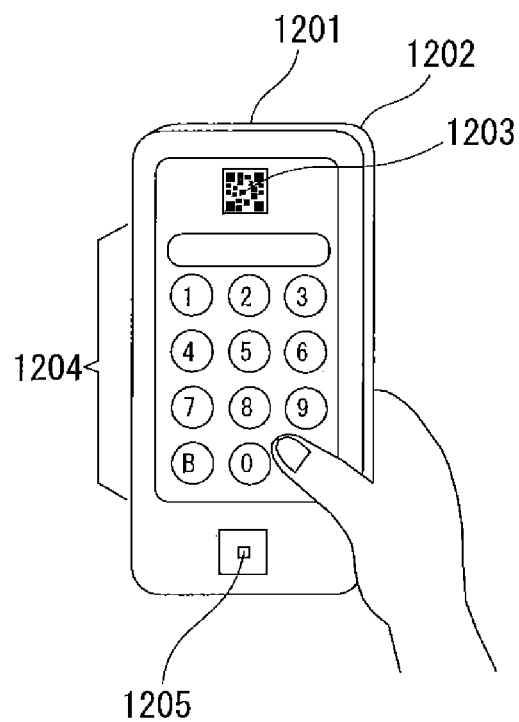
[Fig. 13A]
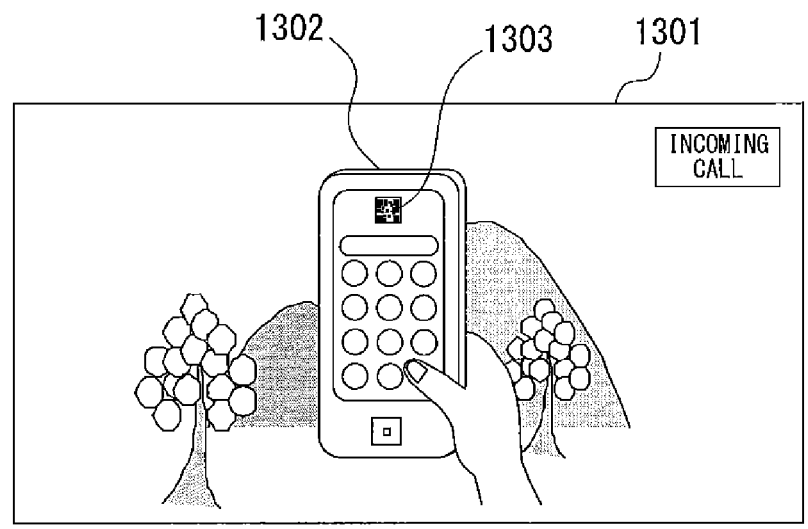

[Fig. 13B]
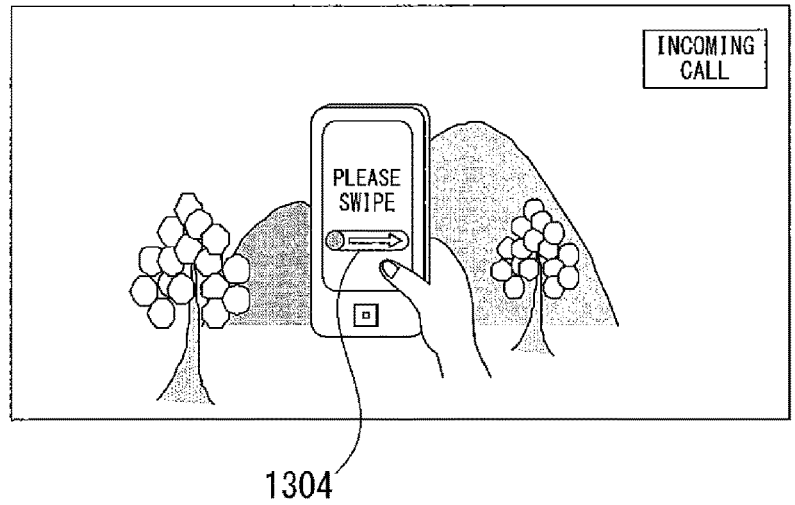
[Fig. 14A]
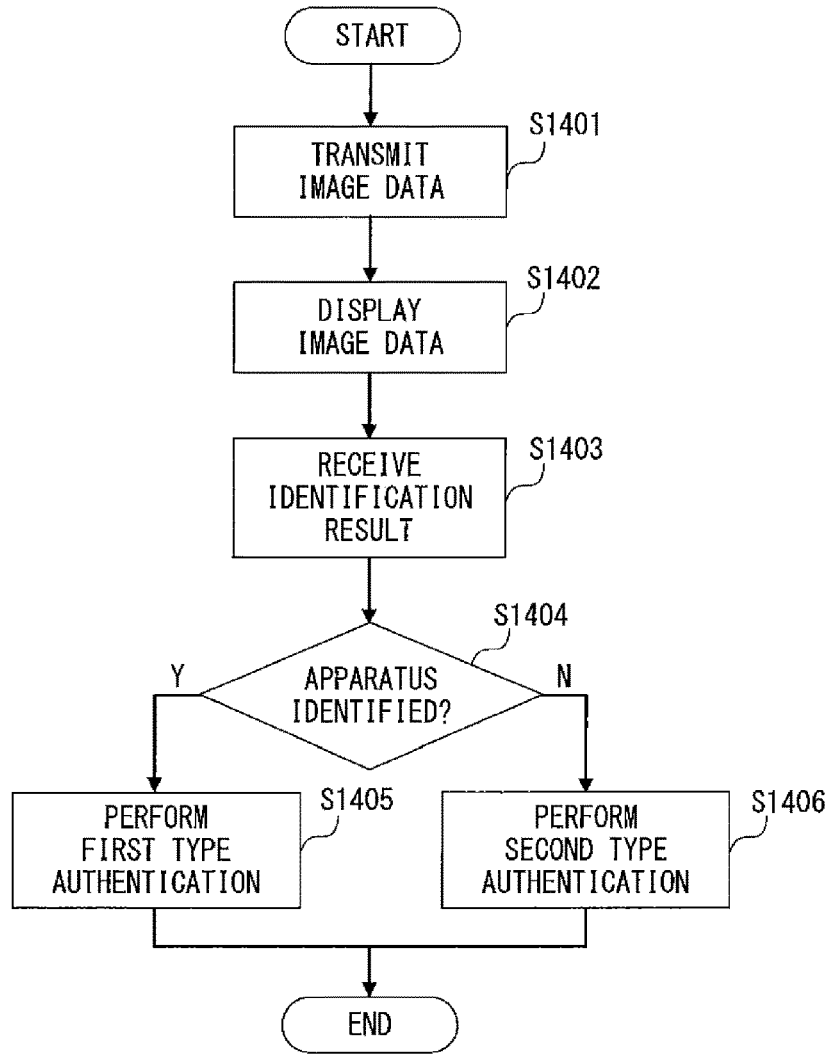

[Fig. 14B]
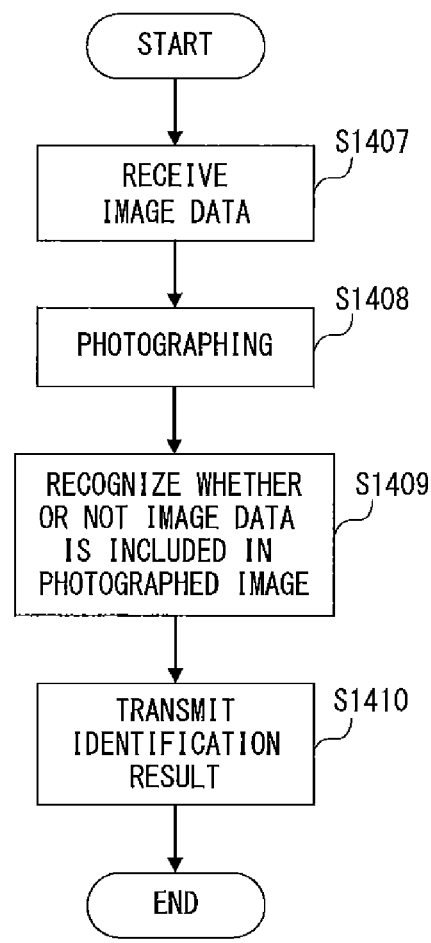

[Fig. 15A]
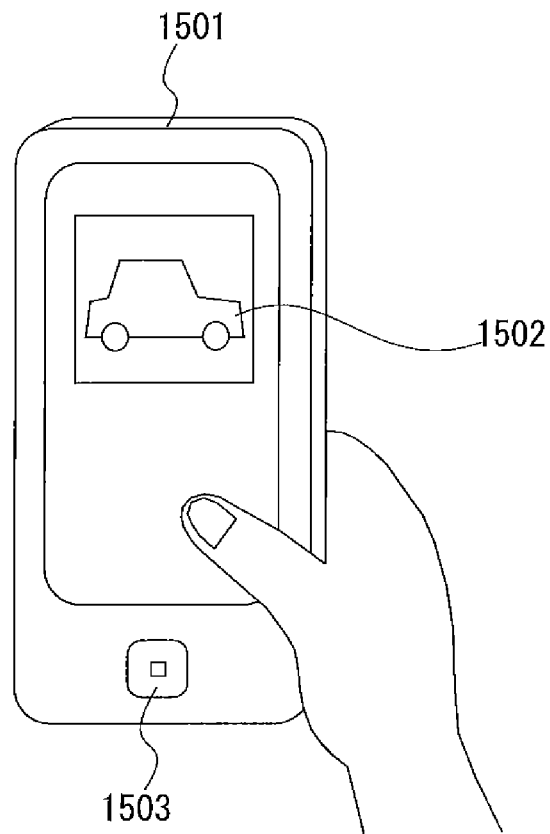
[Fig. 15B]
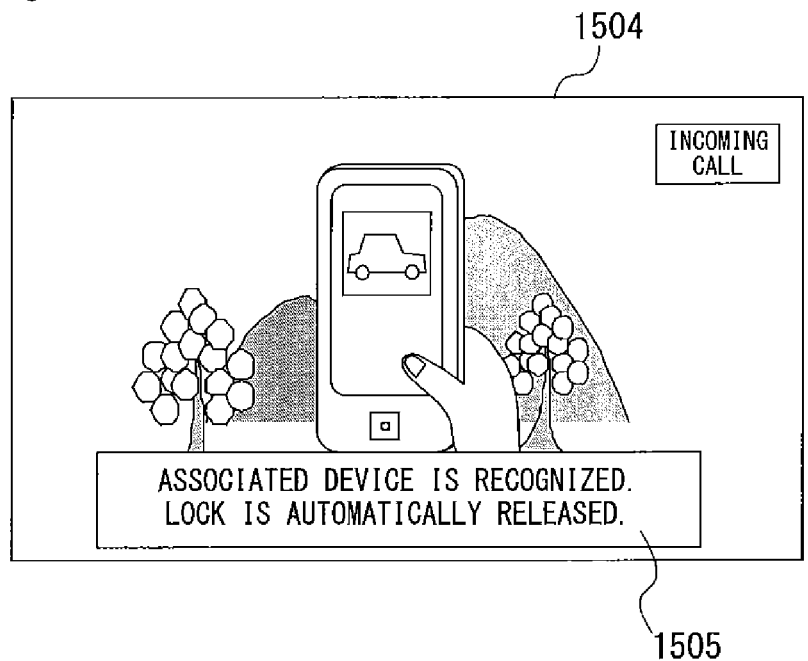

[Fig. 16]
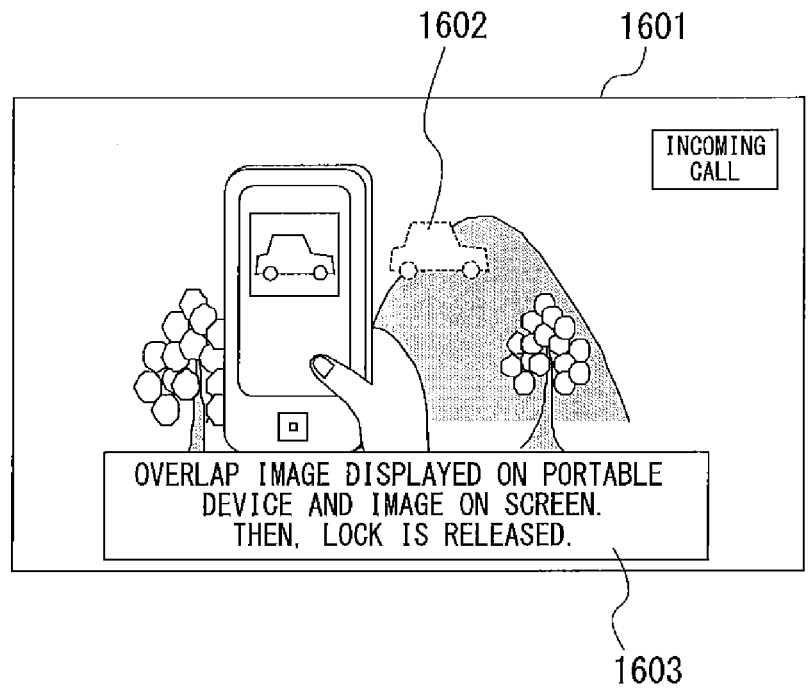
[Fig. 17]
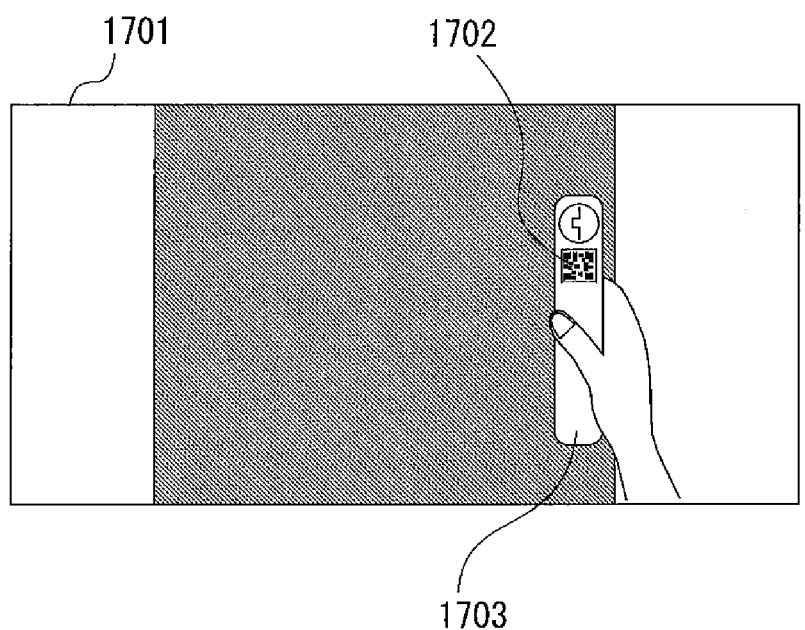

AUTHENTICATION MANAGEMENT METHOD, INFORMATION PROCESSING APPARATUS, WEARABLE DEVICE, AND COMPUTER PROGRAM

TECHNICAL FIELD

This Application is a National Stage filing under 35 U.S.C § 371 of International Application No. PCT/JP2015/005696 filed Nov. 16, 2015; and the contents of all of which are incorporated herein by reference as if set forth in full.

The present disclosure relates to an authentication management method which relieves load of operation for authentication performed by a user by cooperating with a wearable device held by the user.

BACKGROUND ART

In recent years, various wearable devices have been released. The wearable device is a type of a computer used by a user with the wearable device on. The wearable device is effective as a device which notifies information to the user. For example, as to an eyeglass-type wearable device, when incoming call is detected, an icon etc. is overlappingly displayed on actual scenery which is visually recognized through the glass part to notify the incoming call. On the other hand, the wearable device is not suitable for complicated operations. Thereby, in many cases, the wearable device is used in combination with portable information terminals such as smart phones, cell phones, tablet PCs which can easily handle the complicated operation.

It is general that a security lock (hereinafter referred to as "lock") is set on the portable information terminal to authenticate a user before operation. Similar to this, when the wearable device is used, the user is authenticated. For example, the eyeglass-type wearable device performs biometrics authentication, through which, the user is authenticated by means of his eyes. For example, in an eyeglass-type user terminal device disclosed in Patent Literature 1, authentication is performed based on image information of the user's eye. Also, in an eyeglass-type interface device disclosed in Patent Literature 2, the image of the retina of an eyeball of a user is photographed and authentication is performed in accordance with the result. In an eyeglass-type image display device disclosed in Patent Literature 3, the image of the eye of the user is photographed and iris authentication for the user is performed.

CITATION LIST

Patent Literature

PTL 1: Japanese Patent Application Laid-open No. 2012-008746
PTL 2: Japanese Patent Application Laid-open No. 2005-352024
PTL 3: Japanese Patent Application Laid-open No. 2007-003745

SUMMARY OF INVENTION

Technical Problem

In a case where it is necessary to perform user authentication operation for each of the portable information terminal and the wearable device, a plurality of authentication operations are required for the user, which is cumbersome. The main object of the present invention is to propose technology which relieves load of operation performed by a user associating to the authentication when using a plurality of devices in combination.

Solution to Problem

According to the present disclosure, an authentication management method executed in a plurality of apparatuses cooperating each other comprises: communicably connecting, to allow reception of instruction by a user, a first information processing apparatus which performs authentication that the user is a predetermined person and a second information processing apparatus which is worn by the user; in a case where the user wearing the second information processing apparatus has been identified, by the second information processing apparatus, to be the predetermined person, identifying, by the second information processing apparatus, whether or not the first information processing apparatus and the second information processing apparatus are associated with each other as a plurality of apparatuses which perform cooperative processing; in a case where the second information processing apparatus determines that the first information processing apparatus and the second information processing apparatus are associated with each other as a plurality of apparatuses which perform cooperative processing, performing, transmitting, by the second information processing apparatus, an identification result to the first information processing apparatus; and performing processing, by the first information processing apparatus having received the identification result, to reduce the number of operations performed by the user for the authentication.

Advantageous Effects of Invention

According to the present invention, it is possible to reduce load of operation performed by the user associating to the authentication by identifying the association with a first information processing apparatus using a second information processing apparatus which is in use by the user when using a plurality of devices in combination.

BRIEF DESCRIPTION OF DRAWINGS

FIG. 1 is a hardware configuration diagram of information processing system.
FIG. 2 is an example of video viewed through an eyeglass-type device.
FIG. 3 is a function configuration diagram of information processing system in a first example.
FIG. 4A is a diagram explaining procedure of the authentication management method in the first example.
FIG. 4B is a diagram explaining procedure of the authentication management method in the first example.
FIG. 5 is an example of a screen displayed on smartphone in the first example.
FIG. 6A is a diagram illustrating videos viewed through the eyeglass-type device.
FIG. 6B is a diagram illustrating videos viewed through the eyeglass-type device.
FIG. 7 is a diagram illustrating cooperative device DB.
FIG. 8A is a diagram explaining procedure at the time of cooperative processing.
FIG. 8B is a diagram explaining procedure at the time of cooperative processing.
FIG. 9 is an example of a screen of a smartphone at the time of cooperative processing.

FIG. 10A is a diagrams explaining the operation of a smartphone.

FIG. 10B is a diagrams explaining the operation of a smartphone.

FIG. 10C is a diagrams explaining the operation of a smartphone.

FIG. 11A is a diagram explaining procedure of the authentication management method in a second example.

FIG. 11B is a diagram explaining procedure of the authentication management method in a second example.

FIG. 12 is an example of a screen of smartphone according to the second example.

FIG. 13A is a diagram illustrating videos viewed through the eyeglass-type device.

FIG. 13B is a diagram illustrating videos viewed through the eyeglass-type device.

FIG. 14A is a diagram explaining procedure of the authentication management method according to a third example.

FIG. 14B is a diagram explaining procedure of the authentication management method according to a third example.

FIG. 15A is a diagram explaining the operation of a smartphone.

FIG. 15B is a diagram explaining the operation of a smartphone.

FIG. 16 is an example of video viewed through the eyeglass-type device in a fourth example.

FIG. 17 is a diagram illustrating the eyeglass-type device and locking device.

DESCRIPTION OF EMBODIMENTS

In the following, embodiments of the present invention are described. A description is given here with regard to an information processing system (hereinafter, "present system"). FIG. 1 is a hardware configuration diagram of the present system. In the present system 100, a first information processing apparatus 101 and a second information processing apparatus 102 are communicably connected with each other through a network 103. The first information processing apparatus 101 is, for example, a portable information terminal, including smartphone, cell phone, tablet PC, etc. The second information processing apparatus 102 is, for example, the eyeglass-type wearable device as mentioned.

The first information processing apparatus 101 is a computer comprising a central processing unit (CPU) 104, a display device 105, an input and output I/F (interface: the same applies hereinafter) 106, a read only memory (ROM) 107, a random access memory (RAM) 108, a communication I/F 109. These components 104 to 109 perform data exchange through a bus 110. The CPU 104 performs the control of the whole apparatus by executing a first computer program of the present invention. It means that the first computer program is to operate the computer including the CPU 104 as the first information processing apparatus 101. The display device 105 is, for example, a touch panel display. The display device 105 functions as both a display unit and an input unit. Through the control of the CPU 104, various images are displayed at portions where allows an external camera to photograph the images. In this case, the display device functions as the display unit. In a case where an operation from a user is received, the display device functions as the input unit. The input and output I/F 106 is an I/F which controls input and output of data to and from an external storage device and an out-camera (a digital camera mounted on a back surface of the apparatus, i.e., mounted on a surface which is backside of the display device 105). The ROM 107 is a non-rewritable storage medium, in which program for starting up the CPU 104 etc. is stored. The RAM 108 is a volatile rewritable storage medium which is used as work area of the CPU 104. The communication I/F 109 is an I/F for establishing communication with external device including the second information processing apparatus 102.

The second information processing apparatus 102 is a computer comprising a CPU 111, a display device 112, an input and output I/F 113, a ROM 114, a RAM 115, a communication I/F 116. These components 111 to 116 perform data exchange through a bus 117. The display device 112 is a display configured in an eyeglass-type, which displays information in a display area where the user can visually recognize. In the present embodiment, a light transmission-type display is employed, through which, the actual scenery behind the display is visually recognized. Also, with the light transmission type display, various images displayed on the display are overlapping displayed in a foreground with the actual scenery as a background. It is noted that the display device 112 is not limited to the light transmission type display. For example, the actual scenery photographed by a camera separately set may be overlapped with various images. Then, the resultant video may be displayed on a non-transmission type display. Other components 111, and 113 to 116 are almost similar to those described with regard to the first information processing apparatus 101. The components, however, are assembled in an eyeglass-type wearable device entirely. It is noted that the second information processing apparatus 102 is not limited to the eyeglass-type device but it is possible to use a helmet-type device which is used as it is called head mount display. The network 103 connects the first information processing apparatus 101 and the second information processing apparatus 102 and transfers and receives information therebetween. However, the network 103 is not limited to this kind. In the following description, the network 103 is assumed to be an autonomous distributed wireless network.

In the present system 100, it is assumed that the first information processing apparatus 101 operated by the user and the second information processing apparatus 102 held by the user perform a cooperative operation. For example, suppose that there was an incoming call to the first information processing apparatus 101 through the communication I/F 109. Then, in the present system 100, the incoming call can be notified to the user through the display area of the display device 112 of the second information processing apparatus 102. FIG. 2 shows a video 201, which is viewed by the user through the display device 112. Here, an example of overlappingly displaying a notification icon 203, indicating the incoming call, on a visual field (screen) where can view actual scenery, is shown. The notification icon 203 is overlappingly displayed on the video 201 by computer graphics (CG). With a use of a half mirror or a use of known technology such as direct projection of a luminous flux on the retina, the overlapping display of the notification icon 203 on the video 201 is easily achieved. For example, the actual scenery 202 is made to be visually recognized through the half mirror and then, CG is overlappingly displayed thereon. In this case, even in the case where the second information processing apparatus 102 is only outputting the notification icon 203 to the display device 112, it is possible to show the video 201 to the user.

FIG. 3 is a functional configuration diagram of the present system 100. When the CPU 10 executes the first computer program of the present invention, the first information processing apparatus 101 causes the computer including the CPU 104 to function as a first authentication section 301, an authentication type switching section 302, a second authentication section 303, and an identification result receiving section 304. The two authentication sections 301 and 303 performs authentication respectively before the user operates its own apparatus by one of a plurality of authentication types having different loads of operation performed by the user. It is noted that the magnitude of a load of an operation corresponds to the number of steps required for the operation.

For example, the first authentication section 301 performs simple authentication processing by presence/absence of specific operation by the user. The specific operation includes, for example, the swipe of the user's finger in a specific direction. It is possible to omit the user's operation for authentication by, for example, automatically passing the authentication processing. The above authentication type is called a first type authentication. The second authentication unit 303 performs authentication having larger load of operation performed by the user as compared to the first type authentication (thereby, secure level is high). The above authentication type is called a second type authentication. Particularly, to perform the authentication processing, a four-digit number previously registered is matched with a four-digit number input by the user. In case of the above example, in the first type authentication, "swipe" can be input by running a fingertip on the screen once. The number of operation step is thus one. On the other hand, in the second type authentication, to input the four-digit number, the act of touching numerical key and releasing the finger therefrom is required at least four times. The number of operation steps is thus four. Also, in case of the above example, in the second type authentication, in addition to the touch operation, sometimes, the four-digit number needs to additionally be re-membered. Therefore, comprehensively, it can be said that the load of the operation of the second type authentication is higher than that of the first type authentication. It is noted that the magnitude of the loads of the operation of the first type authentication and the second type authentication can be distinguished by, for example, the degree of difficulties of question sentence and the large number of question sentences.

The authentication type switching section 302 determines which one to switch, the first type authentication or the second type authentication. Based on the identification result received from the second information processing apparatus 102, the authentication type switching section 302 switches the method. The second information processing apparatus 102 has a function to determine whether any device has already been associated with the second information processing apparatus 102 or not. The "association" is applied to a device which performs cooperative processing with another device. When the association is identified, the result is transmitted from the second information processing apparatus 102, which is the identification result. This will be described later. The identification result receiving section 304 obtains the identification result and transmits the result to the authentication type switching section 302. This allows omitting the authentication processing as above.

When the CPU 111 executes the second program for control of the present invention, the second information processing apparatus 102 causes the computer including the CPU 111 to function as a photographing section 305, an identification section 306, and an identification result transmitting section 307. Assuming that the out-camera is connected to the input and output I/F 113, the photographing section 305 photographs an identification image displayed on the display of the first information processing apparatus 101. The identification image is a code image representing unique information of the first information processing apparatus 101, including, for example, a two-dimensional code. The identification image may be an image unique to the first information processing apparatus 101. For example, it may be a user's selected image arbitrarily selected by the user for authentication. The unique information includes, for example, a type name of the apparatus main body, device name, IP (Internet Protocol), telephone number, address, appearance, color, and the like.

The identification section 306 attempts to identify the association with the first information processing apparatus 101. If it is successfully identified, the identification unit 306 outputs the identification result. In particular, the identification unit 306 analyzes information represented by the identification image photographed by the imaging unit 305. Then, when the information obtained and the unique information satisfy predetermined condition, the identification unit 306 outputs the identification result. The unique information used for the identification is registered in a cooperative device DB (DB is an abbreviation for data base, the same applies hereinafter) 308 external to the system. The registered information is read and stored in the RAM 115 (storing unit). The predetermined condition is, for example, as follows: identical information, information of link destination is identical, features of the images subjected for the comparison match (for example, positions match) or are similar in a certain range. The identification result transmission section 307 performs transmission processing to transmit the identification result to the identification result receiving section 304 of the first information processing unit 101 through the network 103. With the identification result, the authentication in the first information processing apparatus 101 can be omitted.

Example 1

Next, a description is given with regard to an example of an authentication management method executed in a plurality of apparatuses cooperating each other. In the following description, it is assumed that the first information processing apparatus 101 is a smartphone and the second information processing apparatus is an eyeglass-type wearable device (hereinafter referred to as "eyeglass-type device").

<Authentication by Eyeglass-Type Device>

When the user starts to use the device, the eyeglass-type device authenticates whether a user is an authorized user or not. For example, when it is detected that the device is mounted to a user's head, the eyeglass-type device photographs the user's iris to determine whether the iris photographed matches with the iris of the user previously registered or not. Alternatively, the user's iris may be photographed at every fixed time interval to determine whether the iris matches with the iris of the user previously registered or not. It is noted that, what is important in this example is that the user is using the eyeglass-type device when he uses the smartphone. The fact that the device is owned by the user (mounting the device on his body) means that the device has already been authenticated. In a case where the user is conventionally fixed and it is unlikely that the device is handed to a third person, it is possible to omit the authorization of the user when using the eyeglass-type device.

<Association Between Devices>

When, for example, the user newly obtains a smartphone and an eyeglass-type device, the association is performed. FIG. 4A shows an association processing procedure performed in the smartphone. FIG. 4B shows an association processing procedure performed in the eyeglass-type device. Referring to FIG. 4A, the smartphone generates an apparatus main body identification image (S401). It means that the smartphone operates as an image generating unit. The apparatus main body identification image is an identification image used to cause the eyeglass-type device to identify apparatus information of the smartphone. The smartphone displays the apparatus main body identification image generated on the screen of the display device (S402). It means that the smartphone operates as a display unit. FIG. 5 shows an example of the apparatus main body identification image. In the example shown in FIG. 5, the code image which represents the unique information as mentioned, for example, a two-dimensional code 503, is displayed on a screen 502 of a smartphone 501.

Referring to FIG. 4B, the eyeglass-type device photographs the apparatus main body identification image illustrated in FIG. 5 using the out-camera etc. (S403). At that time, as shown in FIG. 6A, a message 602, prompting to bring the smartphone within a visual field, is displayed in a video 601 which is viewed through the display device 112. The out-camera is mounted on a backside of the display device 105 so that when the user is viewing the touch panel display from the front, a lens is directed in a direction which is the same as that of the user's face. It means that, suppose the user views scenery through the eyeglass-type device and photographs the scenery, the image of the scenery can be photographed with the out-camera when the user mounts the eyeglass-type device on and views the touch panel display from front.

The eyeglass-type device obtains the apparatus information of the smartphone from the photographed image (S404). If the apparatus information of the smartphone is successfully decoded from the image (S405: Y), the eyeglass-type device stores (registers) the apparatus information in the cooperative device DB 308 (S406). If the decoded identical apparatus information already exists, the eyeglass-type device updates the information. If the apparatus information is not successfully decoded from the image (S405: N), the glass-type device does not update the cooperative device DB 308 and ends the processing. When the association processing is successfully completed, the successful completion is notified to the user. FIG. 6B shows a situation in which, when apparatus main body identification information (two-dimensional code) 604 displayed on the display screen 603 of the smartphone is photographed and the association is completed, the user is notified the completion of the association through a message 605. FIG. 7 illustrates one example of the association data stored in the cooperative device DB 308. The association data 701 shown in FIG. 7 is an example in which a device name of the smartphone (SS-1205), as a device name having associated with the eyeglass-type device, and its IP (189.145.2.45) are associated with each other.

<Cooperative Processing Between Devices>

FIGS. 8A and 8B are diagrams explaining a cooperative processing procedure between devices. FIG. 8A is a processing procedure of the smartphone side. FIG. 8B is a processing procedure of the eyeglass-type device side. The contents of these processing procedures will be described in the following with reference to screen examples shown in FIGS. 9 and 10. Referring to FIG. 8A, in response to a user's input of instruction to start operation, processing is started. First, the smartphone receives the identification result for the smartphone itself from the eyeglass-type device (S801).

If the identification result representing that its smartphone itself is previously associated with the eyeglass-type device is obtained (S802: Y), the smartphone performs the first type authentication. The first type authentication is a method having a small load of operation or capable of omitting user's operation (S803). On the other hand, if the identification result representing that the smartphone itself is previously associated with the eyeglass-type device is not obtained (S802: N), the smartphone performs the second type authentication. The second type authentication is a method having a large load of operation but capable of performing more secure authentication (S804). In a case where the user instructs to start the operation using the smartphone, as shown in FIG. 9, information such as the device name or IP may be displayed again on the display screen 902 on the smartphone 901 by the apparatus main body identification image (two-dimensional code) 903. Also, guidance 904, prompting to bring the smartphone into a visual field of the out-camera of the eyeglass-type device, may be displayed.

Referring to FIG. 8B, in response to receiving the event to start the operation from the smartphone side through the network 103 etc., the eyeglass-type device starts processing. First, the eyeglass-type device photographs the image within a visual field with the out-camera (S805). Then, the eyeglass-type device recognizes whether or not there is any device previously associated in the photographed image using the association data stored in the cooperative device DB 308 (S806). At this time, in a case where the information such as the device name or IP is displayed on the smartphone side by the apparatus main body identification image (two-dimensional code), the eyeglass-type device may recognize this. Also, an outer shape of the smartphone may be stored when performing the association.

When the smartphone having the same outer shape as that stored appears within the photographed image, the eyeglass-type device may recognize this. Also, when the type number etc. of the first information apparatus is obtained when performing association, information such as an accurate aspect ratio of the outer shape of the smartphone, position of buttons, color of the body, etc. may be obtained from the information site on a cloud, the eyeglass-type device may recognize the device using such information. Then, the eyeglass-type device transmits the identification result representing whether the associated smartphone is included in the photographed image or not to the associated smartphone (S807). This processing may be repeatedly performed until the associated phone is confirmed to be included in the photographed image or until a fixed time elapses from the instruction to start the operation on the smartphone side is given. Alternatively, the eyeglass-type device may repeatedly perform the processing at every fixed time interval while it is running.

FIGS. 10A to 10C are diagrams illustrating example at the time of cooperative operation. It is assumed that the user brings the smartphone 1002 into a visual field 1001 of the eyeglass-type device after instructing to start operation of the smartphone 1002. Then, the eyeglass-type device photographs an apparatus main body identification image (two-dimensional code) 1003. Then, the eyeglass-type device analyzes the apparatus main body identification image photographed. As a result of the analysis, if the eyeglass-type device identifies that it is a device previously associated (smartphone 1002), the eyeglass-type device notifies the identification result to the device (smartphone 1002). Then, in accordance with the identification result, the smartphone 1002 attempts the authentication by the first type authentication, which is simple, i.e., by a specific operation (swipe) 1004.

On the other hand, in a case where the smartphone 1002 is not brought into the visual field 1001 even after an elapse of a fixed time, or in a case where it is identified that it is the smartphone 1002 not associated, the information is notified to the smartphone 1002 side. At this time, the smartphone performs the second type authentication, which is more secure as compared to the first type authentication. That is, the smartphone attempts to authenticate the user by the 4-digit number input 1005. It is noted that even in a case where it is identified that it is not associated, the specific operation (swipe) 1004, which is simple, may first be prompted for authentication. Then, when the first authentication fails, the four-digit number input 1005 may be prompted as the next authentication method. As mentioned, in a case where the device is a device previously associated with the eyeglass-type device (smartphone 1002), by bringing the device into the visual field, with a simple authentication method, the lock can be released.

In a case where the user uses the smartphone while he is mounting the eyeglass-type device on, usually, the smartphone is unconsciously brought into the visual field of the eyeglass-type device. Thereby, with the authentication method having a small load of operation, the user can release the lock unconsciously. On the other hand, in a case where it is not possible to identify the smartphone associated within the visual field of the eyeglass-type device, such as a case where the smartphone is operated by a third person, the more secure authentication method is suggested. This makes it possible to prevent a situation where the smartphone is used by an unauthorized user.

It is noted that, in the above, the first type authentication is the specific operation (swipe) and the second type authentication is the 4-digit number input, however, such methods are simple the examples. For example, in the first type authentication, no authentication may be performed and in the second authentication, a user's date of birth may be input in a manner of "Year: Month: Date" for authentication. In this case, by simply bringing the associated smartphone into the visual field of the eyeglass-type device, the authentication is released. On the other hand, in a case where the smartphone is used alone or in a case where a person other than an authorized user attempts to operate the smartphone, the authentication to input the user's date of birth will be selected.

Example 2

A description has been given in the example 1 with regard to the example of switching to the first type authentication or the second type authentication after the smartphone receives the identification result from the eyeglass-type device. It is possible, however, to switch to the first type authentication according to the identification result after suggesting the second type authentication. The example of this case is described in the example 2. FIGS. 11A and 11B are diagrams explaining a processing procedure in the second example. FIG. 11A is a processing procedure of the smartphone side. FIG. 11B is a processing procedure of the eyeglass-type device side. FIG. 12 is a diagram explaining the operation state of the smartphone. In response to an instruction to start operation by user's pressing down a button 1205 on the smartphone 1201 in FIG. 12, for example, the smartphone starts processing in FIG. 11A. Referring to FIG. 11A, when the processing is started, the smartphone displays a second authentication screen 1204 for the second type authentication on a display screen 1202 (S1101). Then, the smartphone receives the identification result for the smartphone itself from the eyeglass-type device (S1102). If the identification result representing that the smartphone used by the user is the one which is previously associated with the eyeglass-type device is obtained (S1103: Y), the smartphone switches to the first type authentication, which is simple. On the other hand, if the identification result representing that the smartphone used by the user is the one which is previously associated with the eyeglass-type device is not obtained (S1103: N), the smartphone continues the second type authentication, which is secure. In a case where the second authentication screen is displayed on the smartphone, as shown in FIG. 12, information such as the device name, IP of the smartphone may be displayed on the display screen 1202 on the smartphone 1201 by the two-dimensional code 1203.

In response to receiving the event to start the operation on the smartphone through the network 103 etc., the eyeglass-type device starts processing in FIG. 11B. Referring to FIG. 11B, the eyeglass-type device photographs the image within the visual field with the out-camera (S1105). Then, the eyeglass-type device recognizes whether the device previously associated is included in the photographed image or not using the cooperative device DB 308 etc. (S1106). At this time, in a case where the information such as the device name or IP is displayed on the smartphone side by the two-dimensional code, the eyeglass-type device may recognize this. Then, the eyeglass-type device transmits the identification result representing whether the associated smartphone is included in the photographed image photographed by the eyeglass-type device or not to the associated smartphone (S1107). The identification result transmitted through the step of S1107 is received in the step of S1102 in FIG. 11A.

The processing procedure of the eyeglass-type device side may repeatedly be performed until the smartphone associated is confirmed to be included in the photographed image or until a fixed time elapses from the instruction to start the operation on the smartphone side is given. Alternatively, the eyeglass-type device may repeatedly perform the processing at every fixed time interval while it is running.

FIGS. 13A and 13B are diagrams illustrating an example at the time of the cooperative operation. As shown in FIG. 12, when the user decides to use the smartphone 1201 and presses down the button 1205, the second authentication screen 1204 and the two-dimensional code for identifying the information of the smartphone are displayed. The user does not perform authentication of the smartphone. Instead, as shown in FIG. 13A, the user brings a smartphone 1302 into a visual field 1301 of the eyeglass-type device. The eyeglass-type device identifies a two-dimensional code 1303 displayed on the smartphone 1302. Then, the eyeglass-type device analyzes the information of the two-dimensional code. If it is identified that the smartphone is the one previously associated, the information is transmitted to the smartphone 1302 side. As shown in FIG. 13B, according to the identification result, the smartphone 1302 side switches to a first type authentication 1304, through which, a simple swipe operation is performed, from the second type authentication.

As mentioned, in a case where the smartphone is the one previously associated with the eyeglass-type device, by bringing the smartphone within the visual field, with the simple swipe operation, the lock of the smartphone can be released. On the other hand, in a case where it is not possible to identify the smartphone associated within the visual field of the eyeglass-type device, such as a case where the smartphone is operated by a third person, the smartphone keeps suggesting the authentication method by the 4-digit number input. This prevents a situation where the smartphone is used by an unauthorized user. It is noted that in the example, the second type authentication is the 4-digit number input and the first type authentication is the swipe operation, however, the methods are only the examples. For example, in the first type authentication, the authentication may not be performed. In this case, by simply bringing the smartphone associated into the visual field of the eyeglass-type device, the authentication is released.

Example 3

Descriptions have been given in the first example and the second example in a case where the smartphone displays the two-dimensional code representing unique information. However, the image other than the two-dimensional code may be used. FIGS. 14A and 14B are diagrams explaining the processing procedure at this time. FIGS. 15A and 15B are diagrams explaining example of operation at this time. As shown in FIG. 15A, when the user decides to use a smartphone 1501 and instructs to start operation by pressing down a button 1503 on the smartphone, for example, the smartphone 1501 starts processing in FIG. 14A. When the processing is started, the smartphone 1501 generates image data 1502, which is unique and transmits the data to the eyeglass-type device through the network 103 (S1401). The smartphone displays the image data on the smartphone (S1402) and receives the identification result from the eyeglass-type device (S1403). In a case where the eyeglass-type device successfully identifies the smartphone (S1404: Y), the smartphone performs the first type authentication (S1405). In a case where the eyeglass-type device fails to identify the smartphone (S1404: N), the smartphone performs the second type authentication which is more secure as compared to the first type authentication.

In response to receiving the event to start the operation on the smartphone 1501 through the network 103 etc., the eyeglass-type device starts processing in FIG. 14B. When the processing is started, the eyeglass-type device receives the image data transmitted from the smartphone 1501 through the step of S1401 in FIG. 14A (S1407) and photographs the image of the visual field with the out-camera of the eyeglass-type device (S1408). Then, the eyeglass-type device determines whether or not the image data previously received is included in the photographed image (S1409) and transmits the identification result to the smartphone 1501 (S1410). The identification result transmitted through the step of S1410 is received in the step of S1403 in FIG. 14A.

FIG. 15B is an example of a video 1504 viewed through the eyeglass-type device. In a case where the user brings the smartphone into the visual field and the eyeglass-type device identifies the image data 1502 previously received from the smartphone, guidance 1505, for example, may be displayed, through which, the user is given feedback about the recognition of the associated device.

According to the present example, the smartphone 1501 first transmits the image data to the eyeglass-type device, which is cooperative counterpart, through the network 103. The eyeglass-type device identifies whether or not the image data is included in the photographed image photographed by the eyeglass-type device. Thereby, the smartphone 1501 may employ any image. For example, the image of the user's preference stored in the smartphone 1501 side may be employed.

Example 4

As a variation of the third example, by overlapping the image of the smartphone on a particular point of the visual field of the eyeglass-type device, the lock of the smartphone may automatically be released. FIG. 16 is a diagram explaining example of operation at this time. In response to receiving the event to start operation on the smartphone, the eyeglass-type device receives the image data from the smartphone and overlappingly displays the image 1602 on a video 1601 which is viewed through the eyeglass-type device, which is then presented to the user. Further, the eyeglass-type device presents guidance 1603 instructing the user to overlap the image displayed on the smartphone and the image overlappingly displayed on the video.

Then, when the image on the smartphone is overlapped with the image overlappingly displayed, the eyeglass-type device transmits the identification result that the smartphone has been identified to the smartphone side. In response to the identification result, the smartphone changes the authentication method. Through the examples mentioned so far, in a case where the user presses down the button of the smartphone without any intention of releasing the lock, if it is within a range of the visual field of the eyeglass-type device, the lock is released by a simple method (or without authentication). Through the method of the present example, however, two images need to be overlapped, which prevents a situation in which the lock of the smartphone is released without user's intention.

Example 5

Descriptions have been given in the above examples in a case where, by the user's pressing down the button on the smartphone, the user instructs to start operation on the smartphone. However, not limited to this, the operation may alternatively be started. For example, in a case where an acceleration sensor on the smartphone detects motion that it is taken out from a bag, the cooperative operation may be started. Also, in a case where the smartphone detects the event such as incoming call, mail reception, etc., the cooperative operation may be started. Also, the eyeglass-type device may start the cooperative operation. For example, in a case where the eyeglass-type device always analyzes the image within the visual field and in a case where the eyeglass-type device recognizes an outer shape of the smartphone within the visual field, the eyeglass-type device may start the cooperative operation.

Example 6

Descriptions have been given so far with regard to the examples in a case where the first information processing apparatus is the smartphone and the second information processing apparatus is the eyeglass-type device. The present invention, however, is not limited to these examples. For example, as shown in FIG. 17, the first information processing apparatus may by a locking device for a door, and the second information processing device, in combination with the first information device, may be the eyeglass-type device. FIG. 17 is an example of a video 1701 which is viewed through the eyeglass-type device. By identifying, with the eyeglass-type device, a two-dimensional code 1702 displayed on a locking device 1703 for the door etc., if the locking device is the one previously associated, with a simple authentication act (for example, pulling the door), the lock can be released. On the other hand, if the locking device which is associated cannot be identified within the visual field of the eyeglass-type device, with more secure authentication act (for example, unlock using a physical key), the lock can be released. It is noted that, the first information processing apparatus is not limited to the locking device for the door. For example, the first information processing apparatus may be locking device for locker, automatic ticket gate, and keyless entry device for automobile etc.

Example 7

It is noted that, in the first example, the user's authentication processing through the eyeglass-type device is not the essential processing. However, the processing which is the feature of the present invention may only be operated in a case where the user's authentication processing is performed through the eyeglass-type device. It means that in a case where the user's authentication processing is not performed through the eyeglass-type device (or in a case where the user is not recognized as the authorized user), the eyeglass-type device can always transmit the notification that it failed to identify the smartphone to the smartphone. This allows to suppress risk that the smartphone is being accessed in a case where the unauthorized user obtains the eyeglass-type device and the smartphone at the same time.

Other Embodiments

Description has been given in each example as above with regard to the example of switching one of the first type authentication and the second type authentication by the authentication type switching section 302, however, there may be more number of the authentication methods. It means that, it may be configured to switch to the authentication method having smaller load of operation when receiving the identification result as compared to the load of operation when not receiving the identification result.

Also, the present invention can be realized in the processing which supplies the first computer program and the second computer program as mentioned to the computer through the network 103 or the external storage medium, reads and performs each computer program by one or more CPUs in the computer. The external storage medium includes USB memory, compact disc, DVD, etc. Also, the present invention can be realized by a combination of circuit which realizes one or more functions (for example, ASIC).

REFERENCE SIGNS LIST

104 CPU
105 display device
106 input and output I/F
107 ROM
108 RAM
109 communication I/F
111 CPU
112 display device
113 input and output I/F
114 ROM
115 RAM
116 communication I/F
301 first authentication section
302 authentication type switching section
303 second authentication section
304 identification result receiving section
305 photographing section
306 identification section
307 identification result transmission section
308 cooperative device DB

The invention claimed is:

1. An authentication management method executed in a plurality of apparatuses cooperating with each other, the plurality of apparatuses including at least a first apparatus and a second apparatus, the authentication management method comprising:
    communicably connecting the first apparatus which performs authentication that a user is a predetermined person to allow reception of instruction by the user and the second apparatus which is worn by the user;
    in a case where (a) the user wearing the second apparatus has been authenticated as the predetermined person by the second apparatus, and (b) the first apparatus is identified, by the second apparatus, as an apparatus being associated with the second apparatus to perform cooperative processing, transmitting an identification result from the second apparatus to the first apparatus; and
    wherein the first apparatus is an apparatus which performs authentication by one of a first type authentication and a second type authentication to allow the reception of instruction by the user, wherein the number of operations performed by the user in the second type authentication is larger than the number of operations performed by the user in the first type authentication;
    in a case where the identification result is received from the second apparatus, the first type authentication is performed, and in a case where the identification result is not received from the second apparatus, the second type authentication is performed.

2. The authentication management method according to claim 1, wherein in the first type authentication, the operation by the user can be omitted.

3. The authentication management method according to claim 1, wherein
    the first apparatus is a portable information terminal having a display on which an identification image is displayed, the identification image being used for the identification of the first apparatus; and
    the second apparatus is a wearable device which photographs the identification image and transmits the identification result to the portable information terminal in a case where the identification image photographed satisfies a predetermined condition.

4. The authentication management method according to claim 3, wherein the identification image is a code image representing unique information of the portable information terminal; and
    the wearable device (a) photographs the code image, (b) analyzes unique information represented by the code image photographed, and (c) transmits the identification result from the wearable device to the portable information terminal in a case where the unique information obtained by the analysis and information previously registered satisfy a predetermined condition.

5. The authentication management method according to claim 3, wherein the wearable device is an eyeglass-type device which displays information in a display area where the user can visually recognize;
    the identification image is a specific image selected by the user;

the portable information terminal displays the specific image on the display and transmits information representing the specific image to the eyeglass-type device; and the eyeglass-type device having received the information transmitted transmits the identification information to the portable information terminal in a case where the specific image represented by the information transmitted matches with the specific information photographed and displayed in the displayed area.

6. An information processing apparatus communicably connected with a wearable device which is worn by a user comprising:

an obtaining unit configured to obtain an identification result from the wearable device having authenticated that the user wearing the wearable device is a predetermined person, the identification result representing that the information processing apparatus is associated with the wearable device to perform cooperative processing;

an authentication unit configured to perform, to allow reception of instruction to the information processing apparatus by the user, authentication that the user is a predetermined person by one of a first type authentication and a second type authentication, wherein the number of operations performed by the user in the second type authentication is larger than the number of operations performed by the user in the first type authentication; and a switching unit configured to switch an authentication method from the second type authentication to the first type authentication in a case where the identification result is received.

7. The information processing apparatus according to claim 6, wherein in the first type authentication, the operation by the user can be omitted.

8. The information processing apparatus according to claim 6, wherein the wearable device is an eyeglass-type device, and the wearable eyeglass-type device comprising:

a photographing unit configured to photograph scenery which the user views when the user wears the eyeglass-type device, the photographed image is displayed in a display area where the user can visually recognize;

an identification unit configured to output the identification result in a case where the photographed image photographed by the photographing unit satisfies a predetermined condition; and a transmitting unit configured to transmit the identification result to the information processing apparatus.

9. The information processing apparatus according to claim 8, further comprising:

an image generating unit configured to generate the identification image for causing the wearable eyeglass-type device to identify the information processing apparatus; and a display unit configured to display the identification image generated at portions where the photographing unit is capable of photographing.

10. The information processing apparatus according to claim 9, further comprising:

a transmitting unit configured to transmit an identification image which is identical to the identification image displayed by the display unit to the wearable eyeglass-type device, causing the wearable eyeglass-type device to transmit the identification result based on the identification image.

11. A wearable device communicably connected with an information processing apparatus, where the information processing apparatus performs, to allow reception of operation of a user, authentication that the user is a predetermined person, and displays an identification image representing identification information of the information processing apparatus on a predetermined display when performing authentication, comprising:

an authentication unit configured to perform authentication that the user wearing the wearable device is the predetermined person;

a photographing unit configured to photograph the identification image displayed on the predetermined display which the user views through the wearable device;

an obtaining unit configured to obtain, from the information processing apparatus, information representing identification image displayed on the predetermined display;

an identification unit configured to output an identification result representing that the information processing apparatus is associated with the wearable device and is to perform cooperative processing in a case where the information obtained by analyzing the photographed image represents that an identification image photographed by the photographing unit includes an image represented by the information obtained by the obtaining unit; and a transmitting unit configured to transmit the identification result to the information processing apparatus, wherein the number of operations performed by the user for the authentication is reduced based on the identification result.

12. The wearable device according to claim 11, further comprising:

a display device for displaying information in a display area where the user can visually recognize.

13. A computer program for causing a computer to operate as an information processing apparatus which is communicably connected with a wearable device which is worn by a user, the computer program causing the computer to function as:

an obtaining unit configured to obtain an identification result from the wearable device having authenticated that the user wearing the wearable device is a predetermined person, the identification result representing that the information processing apparatus is associated with the wearable device to perform cooperative processing;

an authentication unit configured to perform, to allow reception of instruction to the information processing apparatus by the user, authentication that the user is a predetermined person by one of a first type authentication and a second type authentication, wherein the number of operations performed by the user in the second type authentication is larger than the number of operations performed by the user in the first type authentication; and a switching unit configured to switch an authentication method from the second type authentication to the first type authentication in a case where the identification result is received.

14. A computer program for causing a computer to operate as a wearable device which is communicably connected with an information processing apparatus, the information processing apparatus performing, to allow reception of operation of a user, authentication that the user is a predetermined person, and displaying an identification image representing identification information of the information processing apparatus on a predetermined display when performing authentication, the computer program causing the computer to function as:

an authentication unit configured to perform authentication that the user wearing the wearable device is the predetermined person;

a photographing unit configured to photograph the identification image displayed on the predetermined display which the user views through the wearable device;

an obtaining unit configured to obtain, from the information processing apparatus, information representing identification image displayed on the predetermined display;

an identification unit configured to output an identification result representing that the information processing apparatus is associated with the wearable device and is to perform cooperative processing in a case where the information obtained by analyzing the photographed image represents that an identification image photographed by the photographing unit includes an image represented by the information obtained by the obtaining unit; and a transmitting unit configured to transmit the identification result to the information processing apparatus, wherein the number of operations performed by the user for the authentication is reduced based on the identification result.

\* \* \* \* \*